United States Patent [19]

Ohshima et al.

[11] Patent Number: 4,710,908

[45] Date of Patent: Dec. 1, 1987

[54] SERVO APPARATUS FOR COMPENSATING FOR WARP AND DEFLECTION DEVIATIONS ON OPTICAL DISCS

[75] Inventors: Ken Ohshima; Tadashi Shimizu, both of Tokyo, Japan

[73] Assignee: Olympus Optical Company Limited, Tokyo, Japan

[21] Appl. No.: 652,451

[22] Filed: Sep. 19, 1984

[30] Foreign Application Priority Data

Sep. 20, 1983 [JP] Japan ................................ 58-173845

[51] Int. Cl.⁴ ........................... G11B 7/00; G11B 7/09
[52] U.S. Cl. ...................................... 369/32; 369/45; 369/54; 369/58; 369/100; 369/116
[58] Field of Search ................... 369/32, 33, 43–46, 369/51, 54, 58, 116, 41, 47, 50, 53, 57, 106, 100; 250/201 AF, 201 DF; 360/77, 78

[56] References Cited

U.S. PATENT DOCUMENTS

| | | | |
|---|---|---|---|
| 4,093,961 | 6/1978 | Kanamaru | 369/58 |
| 4,142,209 | 2/1979 | Hedlund et al. | 360/77 |
| 4,286,318 | 8/1981 | Immink et al. | 369/44 |
| 4,476,555 | 10/1984 | Joichi et al. | 369/46 |
| 4,488,277 | 12/1984 | McFarlane et al. | 369/54 |
| 4,507,763 | 3/1985 | Kato | 369/44 |
| 4,527,263 | 7/1985 | Nakagawa | 369/46 |

Primary Examiner—Raymond F. Cardillo
Assistant Examiner—Steven R. Garland
Attorney, Agent, or Firm—Robert E. Burns; Emmanuel J. Lobato; Bruce L. Adams

[57] ABSTRACT

Apparatus for compensating for physical deviations due to warp and surface deflections in optical discs during optical recording and reproducing operations. Focus error signals are developed corresponding to the individual addresses of the physical deviations and the extent of deviation from the in-focus position of the focusing lens by moving a light pickup under control of a microcomputer radially of the disc so that N given radial pitch intervals are defined relative to the record surface of the optical discs and M circumferential address positions of each rotation of the disc. The detector detects the focus error signal values at $M_xN_x$ address locations which are memorized in a memory storing $M \times N$ values and these are used for developing control signals for moving a focusing lens vertically with an actuator activated by the control signals so that the position of the focusing lens vertically is positioned relative to the record surface so that the focus distance to the record surface is compensated for the physical deviations and an in-focus condition obtained. An arithmetic unit develops light intensity correction values from the memorized data and from this power correction values signals are applied to the source of light beam so that the light beam is applied to the record surface as a spot of proper area dimensions and intensity compensated for the physical deviations.

3 Claims, 7 Drawing Figures

| X₀₀ | X₀₁ | X₀₂ | X₀₃ |
|---|---|---|---|
| $X_{00}$ | $X_{01}$ | $X_{02}$ | $X_{03}$ |
| $X_{10}$ | $X_{11}$ | $X_{12}$ | $X_{13}$ |
| $X_{20}$ | $X_{21}$ | $X_{22}$ | $X_{23}$ |
| ⋮ | ⋮ | ⋮ | ⋮ |
| $X_{(N-1)0}$ | $X_{(N-1)1}$ | $X_{(N-1)2}$ | $X_{(N-1)3}$ |
| $X_{N0}$ | $X_{N1}$ | $X_{N2}$ | $X_{N3}$ | radial direction ↓ circumferential direction →

SERVO APPARATUS FOR COMPENSATING FOR WARP AND DEFLECTION DEVIATIONS ON OPTICAL DISCS

BACKGROUND OF THE INVENTION

The present invention relates to an apparatus for recording and reproducing informations on an information recording medium, such as an optical disc.

When information is recorded and reproduced on a recording medium such as an optical disc with a laser beam, if the recording surface of the optical disc and a light beam incident angle are changed due to a warp and a surface deflection of the optical disc, the distribution of light beam diameter and intensity becomes changed largely as shown in FIG. 1. If, in the case of information recording, the light beam power is decreased on the recording surface of the optical disc, the length of a pit to be recorded becomes changed.

Provided that the writable beam power is PW, the length of pit is illustrated as shown in FIG. 1(a) when the recording surface of the disc is not slanted, is illustrated as shown in FIG. 1(b) when the recording surface is slanted in the (+) direction, and is illustrated as shown in FIG. 1(c) when the recording surface is slanted in the (−) direction.

As described above, if the write beam intensity on the recording surface of the optical disc is changed due to the warp and the surface deflection of the disc, the writing conditions on the recording surface of the optical disc become unstable.

SUMMARY OF THE INVENTION

It is an object of the present invention to overcome the above described disadvantage of conventional information recording and reproducing apparatus.

It is another object of the present invention to provide an apparatus for recording and reproducing information in which amounts of the warp and the surface deflection of an optical disc are previously measured upon the change-over of the disc, and the measured results are arithmetically and logically processed thereby controlling the writing beam power or the writing light emitting time or the like resulting in a stabilization of writing conditions of the light beam on the recording surface of the optical disc.

According to the present invention there is provided an apparatus for recording and reproducing information comprising an information recording medium, a feeding mechanism for moving a light pickup in the radial direction of the recording medium, means for detecting vertical displacement of a recording surface of the recording medium, means for positioning the feeding mechanism by dividing the recording surface of the recording medium into M equal parts at a given radial pitch intervals, memory means with memory elements for M×N addresses for storing the vertical displacement data from the detection means by dividing the data for at least one turn of the recording medium into N equal parts, and an arithmetic unit for arthmetically operating inclinations in circumferential and radial directions of the recording medium by the M×N address data from the memory means.

The means for detecting vertical displacement of recording surface of the recording medium measures the focus driving current for the light pick-up. In case of recording information on the recording medium, when addresses at portions to be recorded of the medium are externally assigned a recording light beam power is corrected by reading out it from the corresponding memory element.

The apparatus further comprises means for discriminating the recording surface of the medium to see if it is good or not. The memory means is a random access memory. The arithmetic unit is a micro computer.

BRIEF DESCRIPTION OF THE DRAWINGS

These and other features and advantages of the present invention will become readily apparent from the following detailed description of one embodiment of the present invention, particularly when taken in connection with the accompanying drawings wherein like reference numerals designate like or functionally equivalent parts throughout, and wherein.

DESCRIPTION OF THE PREFERRED EMBODIMENT

Figure 1:
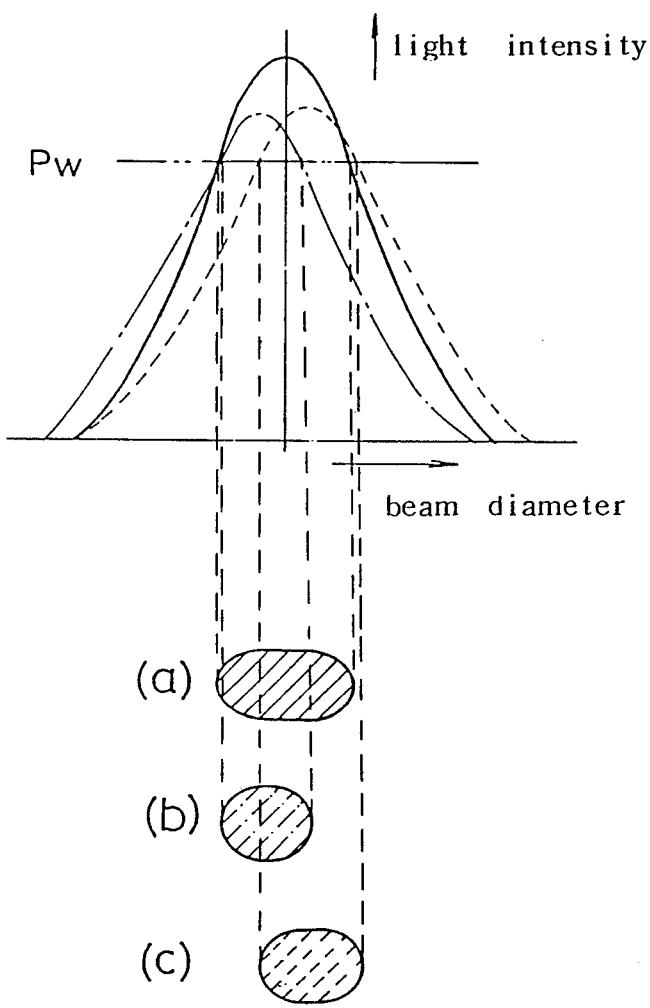
FIG. 1, consisting of (a)-(c), is an explanatory view showing a light intensity distribution of light spots incident on an optical disc in the conventional optical disc recording and reproducing apparatus.

Referring now to the drawings, there is shown an embodiment of an apparatus for recording and reproducing information according to the present invention.

Figure 2:
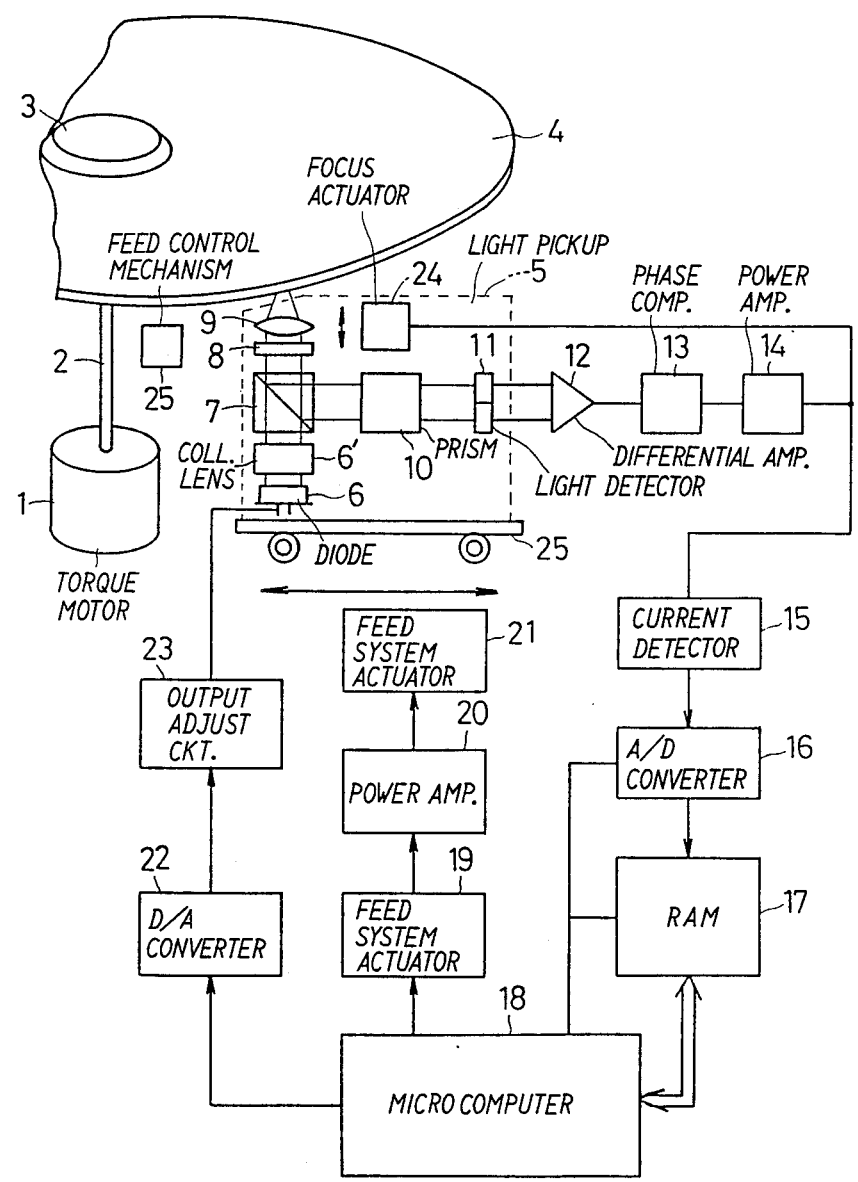
FIG. 2 is a circuit arrangement showing construction of an information recording and reproducing apparatus according to the present invention.

FIG. 2 shows one embodiment of an apparatus for recording and reproducing information according to the present invention. In this embodiment rotating torque of a motor 1 is transmitted to a turn table (not shown) through a shaft 2 thereby rotating an optical disc 4 which is clamped to a disc clamp 3.

A light pick-up 5 is arranged to make it a coarse feeding in the radial direction of the disc 4 by a feeding control mechanism 25.

The light pick-up 5 comprises a light source, for example a laser diode 6, a collimator lens 6', a beam splitter 7, a ($\lambda/4$) wave plate 8, an objective 9, a prism 10 with critical angle reflection, a light detector 11 consisting of four divided elements, and a focus actuator 24.

In such a construction, as shown in FIG. 2 the recording surface of the disc 4 is divided into N equal parts at regions $X_0$ to $X_n$ by a micro computer 18 at regular intervals or at change-over of optical disc and the signals from a feeding control circuit 19 are supplied to a power amplifier 20 thereby shifting the feeding control mechanism 25 and stopping it at addressed position.

The light beam radiated from the laser diode 6 of the light pick-up 5 which is positioned by the feeding control mechanism 25 is incident of the ($\lambda/4$) wave plate 8 through the collimator lens 6' and the beam splitter 7.

The light incident on the ($\lambda/4$) wave plate 8 is converted to a circularly polarized light from the linearly polarized light and focussed on the information recording surface of the optical disc 4 in the shape of spot through the objective 9 and then reflected therefrom.

The reflected light is again incident through the objective 9 on the (λ/4) wave plate 8 and converted to the linearly polarized light from the circularly polarized light therein. Since polarization planes of the incident light and the reflected light for the disc 4 are different with each other so that the light incident on the beam splitter 7 from the disc 4 is reflected at a right angle to the incident light axis and incident on the prism 10 thereby detecting the focussing conditions on the recording surface of the disc 4. The light from the prism 10 is incident on the detector 11 and converted into electrical signals therein.

Two kinds of electrical signals detected by the detector 11 are supplied to a differential amplifier 12 thereby forming focussing error signals which correspond to signals caused by a warp and a surface deflection or the like of the disc 4. These focussing error signals are supplied to a phase compensating circuit 13 thereby making phase compensation for stabilizing a focus servo system.

The phase compensated focussing error signals are amplified by a power amplifier 14 so as to drive the focus actuator 24. To this end the output of the power amplifier 14 is supplied to the focus actuator 24 to drive the objective 9 in the vertical direction thereby always following the focussing conditions to the warp and the surface deflection of the disc.

If the output of the power amplifier 14 is then traced with time the surface deflection of the optical disc can be measured. The surface deflection herein is to mean vertical displacement of the optical disc within a periphery of the disc at optional radius thereof, and the warp is to mean a vertical displacement of the optical disc in the radial direction of optional sector of the information track.

Figure 3:
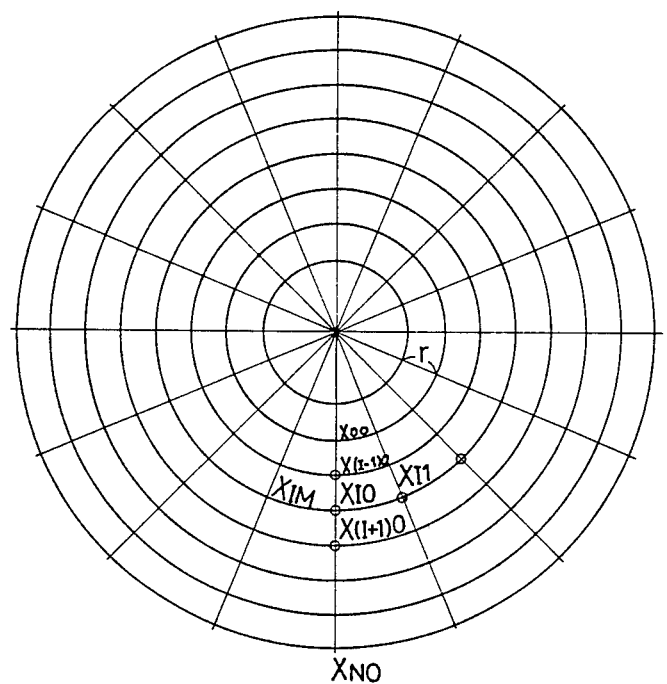
FIG. 3 is an explanatory view showing address means for detecting a warp between two positions on the optical disc.

The determination of access for recording on the recording surface of the disc is performed for every given annular space $\gamma$ obtained by dividing circumferentially the N radial regions $X_N$ to $X_{00}$ of the recording surface into M equal parts with the use of the feeding control mechanism 25, and this access determination is repeated N times so that the warp between two positions of the recording surface can be detected by calculating distances $X_{00}$ to $X_{10}$, $X_{(I-1)}$ to $X_I$, ... as shown in FIG. 3.

As shown in FIG. 2, the output current of the power amplifier 14 is also converted to the corresponding voltage value thereof by a current detecting circuit 15. The output voltage of the current detecting circuit 15 which represents a driving amount of the focus actuator 24 is supplied to an analog-digital converter 16 through a low-pass filter (not shown) for passing through only zones of the warp and the surface deflection of the optical disc. The analog-digital converter 16 A/D converts the driving amount of the actuator 24 by means of a clock signal previously synchronized with rotation of the disc (in FIG. 3 the time required to divide one rotation thereof into M equal parts) and the converted driving amount is written in a RAM (random access memory) 17. The RAM 17 stores driving amount of respective rotations of the disc corresponding to regions $X_0$, $X_1$ to $X_N$.

Figures 4, 5:
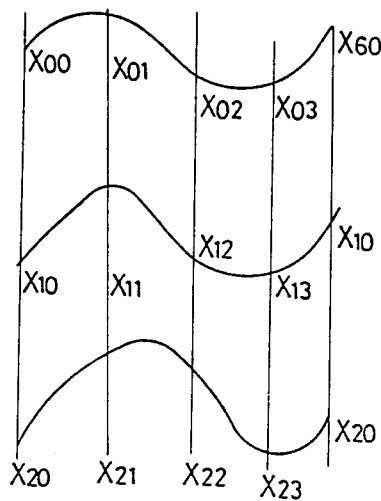
FIG. 4 is an explanatory view showing conditions of particular address to be stored in RAM shown in FIG. 2.
FIG. 5 is an explanatory view showing address assigning condition of RAM shown in FIG. 2.

As shown in FIG. 4, for example, digital values corresponding to the driving amount are stored in the particular address of the RAM corresponding to $X_{00}$, $X_{01}$, $X_{02}$, $X_{03}$ (in case of dividing M into four equal parts). That is, $X_{00}$ to $X_{03}$ are stored.

After measuring driving amount of the actuator until previously determined $X_0$ constituting one rotation of the disc, the micro computer 18 supplies sequential access instruction to the feeding control circuit 19 and supplies to a feeding system actuator 21 through the feeding power amplifier 20 thereby positioning the actuator 21 at the position $X_1$ and then the region $X_1$ is measured over one rotation of the disc in the same manner as the region $X_0$. This process is repeated until the region $X_N$. In this manner the RAM address is assigned as shown in FIG. 5.

Provided that the contents of the address corresponding to the region $X_{ij}$ is $VX_{ij}$ the following equation is obtained (in FIG. 5, i=0 to N, j=0 to 3).

Warp of $X_{ij} - X_{(i+1)j} = VX_{ij} - VX_{(i+1)j}$

Surface deflection of $X_{ij} - X_{i(j+1)} = VX_{ij} - VX_{i(j+1)}$

By sequentially executing arithmetic and logical operation as described above the inclination between two points of the recording surface can be measured. In this embodiment the warp and the surface deflection of the optical disc between two points thereof are explained. If accurate interpolation and arithmetic and logic operations are performed the warp and the surface deflection of the disc can be calculated more accurately.

That is, the amounts of warp and surface deflection corresponding to the special address of the optical disc can be obtained.

When the above process has been completed, if the writing address is assigned the amounts of warp and surface deflection of the disc corresponding thereto are immediately obtained so that this value can be operated as a beam power correcting value by the micro computer 18.

This power correction value is supplied to a laser diode output adjusting circuit 23 through a digital-analog converter 22 thereby controlling light emitting intensity of the laser diode 6 when information writing can be performed.

What is claimed is:

1. In an apparatus for optically recording and reproducing information having a rotationally driven optical information record medium, optical light pickup means having means for developing a light beam and optical focusing lens for focusing the light beam as a spot of light on a record surface of the information record medium, means for displacing the light pickup means in a radial direction relative to the record surface of the information record medium to given addresses defined on the record surface to which said light pickup means moves, the light beam and lens are positioned relative to the record medium during rotation thereof, detection means including the optical pickup means scanning the record surface prior to recording thereon and detecting physical deviations of the record surface relative to the plane of the record surface caused by warp and record surface radial deflections and including means to develop focus error signals of the lens including focus error signals representative of an out-of-focus distance relative to the record surface corresponding to values of the physical deviations corresponding to respective addresses on the record surface, means for generating correction current signals necessary to position the lens in-focus in a position compensating for the out-of-focus distance due to corresponding physical deviations on the record surface, means for detecting and measuring correction current values of current necessary to position the lens in-focus in a position compensating for the out-of-focus distance due to the storing correction information for correcting positioning of the lens in-focus including correction information developed from the correction current values for correction of the spot of light intensity corresponding to the current values representative of the individual physical deviations and to the individual respective addresses thereof on said record surface, control means effective during read and write operations for positioning the focusing lens at in-focus positions relative to the record surface compensating for said physical deviations so that the light beam is applied to the record surface in an in-focus condition during both recording and reproducing modes of operation of said apparatus, and power varying means for varying the intensity of the spot of light as a function of the correction information to compensate for spot intensity changes caused by said physical deviations on the record surface.

2. In an apparatus for optically recording and reproducing information having a rotationally driven optical information record medium according to claim 1, in which said means for developing said beam of light comprises a laser diode, means for developing power correction values in dependence upon the detected correction current values attributed to said physical deviations, and said power varying means having means for controlling the intensity of the light emitted by said laser diode for compensating for said physical deviations as a function of said power correction values.

3. In an apparatus for optically recording and reproducing information having a rotationally driven optical information record medium according to claim 1, in which said means for developing said power correction values comprises means for arithmetically developing said power correction values as a function of said detected correction current values.

* * * * *